United States Patent
Guan et al.

(10) Patent No.: US 9,336,606 B2
(45) Date of Patent: May 10, 2016

(54) IMAGE CAPTURING APPARATUS, IMAGE CAPTURING METHOD, AND COMPUTER PROGRAM PRODUCT

(75) Inventors: Haike Guan, Kanagawa (JP); Liu Tong, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 371 days.

(21) Appl. No.: 13/980,627

(22) PCT Filed: Jan. 23, 2012

(86) PCT No.: PCT/JP2012/051898
§ 371 (c)(1),
(2), (4) Date: Jul. 19, 2013

(87) PCT Pub. No.: WO2012/105460
PCT Pub. Date: Aug. 9, 2012

(65) Prior Publication Data
US 2013/0314548 A1     Nov. 28, 2013

(30) Foreign Application Priority Data

Feb. 3, 2011    (JP) .................................. 2011-021691

(51) Int. Cl.
*H04N 5/225*     (2006.01)
*G06T 7/20*     (2006.01)
(Continued)

(52) U.S. Cl.
CPC ............ *G06T 7/2033* (2013.01); *G06K 9/3233* (2013.01); *G06T 7/204* (2013.01);
(Continued)

(58) Field of Classification Search
USPC ........................................................ 348/169
See application file for complete search history.

(56) References Cited

U.S. PATENT DOCUMENTS

| 5,473,369 A | 12/1995 | Abe |
| 8,253,819 B2 | 8/2012 | Ishii et al. |

(Continued)

FOREIGN PATENT DOCUMENTS

| CN | 101064837 A | 10/2007 |
| CN | 101324958 A | 12/2008 |

(Continued)

OTHER PUBLICATIONS

Combined Office Action and Search Report issued Feb. 10, 2015 in Chinese Patent Application No. 201280007319.6 (with English language translation).

(Continued)

*Primary Examiner* — Nigar Chowdhury
(74) *Attorney, Agent, or Firm* — Oblon, McClelland, Maier & Neustadt, L.L.P.

(57) ABSTRACT

An image capturing apparatus includes: an image input unit that inputs an image; a designating unit that receives designation of an initial tracking-target region that is a first region in a first image frame of time-series image frames input from the image input unit; a feature value extracting unit that extracts a predetermined feature value from a target region in the first image frame; a first search unit that searches for a second region obtained by changing a size of the first region and by determining whether the feature value extracted from the second region satisfies a predetermined condition for enabling successful tracking and sets the second region as a new initial tracking-target region; and a second search unit that searches for a region similar to the newly set initial tracking-target region as a tracking-result region in a second image frame subsequent to the first image frame.

11 Claims, 8 Drawing Sheets

F0 FRAME

FM FRAME

(51) Int. Cl.
  *H04N 5/232* (2006.01)
  *G06K 9/32* (2006.01)
(52) U.S. Cl.
  CPC ....... *H04N5/23216* (2013.01); *H04N 5/23219* (2013.01); *H04N 5/23293* (2013.01); *G06T 2207/10016* (2013.01); *G06T 2207/10024* (2013.01); *G06T 2207/20104* (2013.01); *G06T 2207/30201* (2013.01); *H04N 2201/0084* (2013.01)

(56) References Cited

U.S. PATENT DOCUMENTS

| | | | |
|---|---|---|---|
| 2009/0010549 A1 | 1/2009 | Muramatsu | |
| 2009/0141940 A1 | 6/2009 | Zhao et al. | |
| 2011/0001840 A1* | 1/2011 | Ishii | G02B 7/365 348/222.1 |
| 2011/0090345 A1* | 4/2011 | Ishii | H04N 5/23248 348/169 |
| 2012/0293665 A1 | 11/2012 | Guan | |

FOREIGN PATENT DOCUMENTS

| | | |
|---|---|---|
| CN | 101553846 A | 10/2009 |
| JP | 6-311410 | 11/1994 |
| JP | 2008-153879 | 7/2008 |
| JP | 2009-010453 | 1/2009 |
| JP | 2010-113732 | 5/2010 |
| JP | 2011-193443 | 9/2011 |
| JP | 2012-073997 | 4/2012 |
| WO | WO 2008/073998 A1 | 6/2008 |
| WO | WO 2009/098894 A1 | 8/2009 |

OTHER PUBLICATIONS

Korean Notice of Allowance issued Jul. 31, 2014, in Korea Patent Application No. 10-2013-7020090 (with English translation).

International Search Report issued Feb. 21, 2012 in PCT/JP2012/051898 filed Jan. 23, 2012.

Extended European Search Report issued Nov. 4, 2015 in Patent Application No. 12741727.7.

Chandrika Kamath, et al., "Salient Points for Tracking Moving Objects in Video", Proceedings of SPIE, SPIE and IS&T, vol. 5685, XP 2573152 A, 2005, pp. 442-453.

* cited by examiner

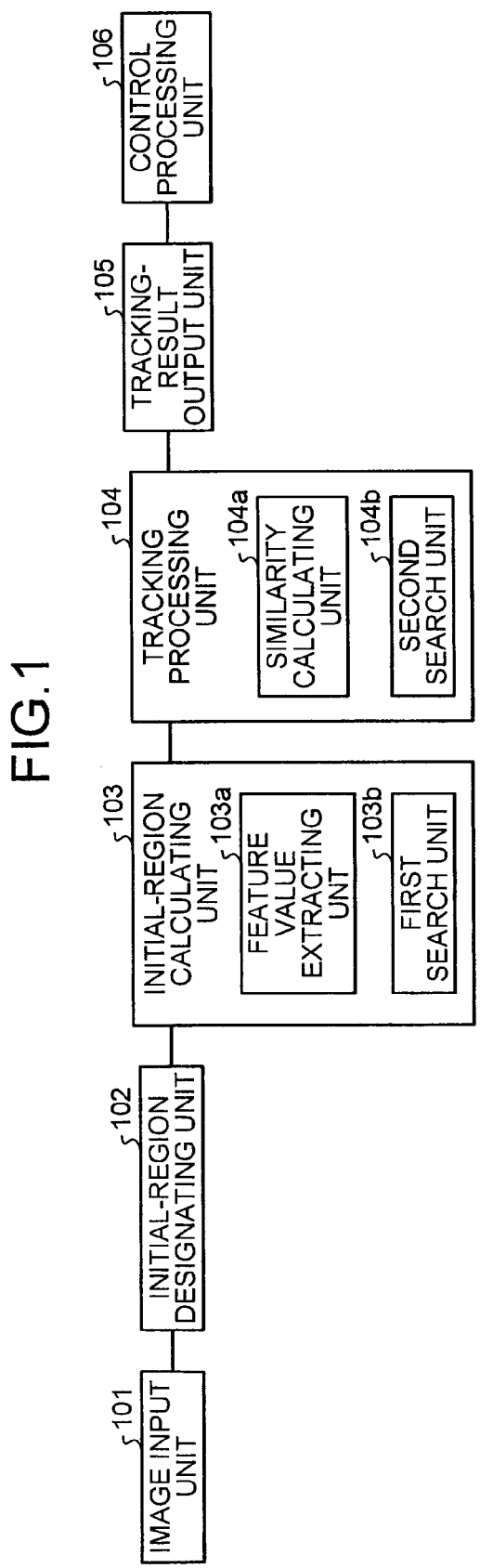

F0 FRAME

FM FRAME

FM FRAME

F0 FRAME

FM FRAME

FO FRAME

FM FRAME

IMAGE CAPTURING APPARATUS, IMAGE CAPTURING METHOD, AND COMPUTER PROGRAM PRODUCT

TECHNICAL FIELD

The present invention relates to an image capturing apparatus and an image capturing method.

BACKGROUND ART

Conventionally, methods for controlling a camera by tracking an object captured in consecutive, time-series image frames and controlling the camera according a result of the tracking have been proposed. For example, Japanese Patent Application Laid-open No. 2008-153879 proposes an automatic tracking image-capturing apparatus that tracks an object in image frames and adjusts a torque value related to camera control by using a motion vector resultant from the tracking.

Japanese Patent Application Laid-open No. 2009-10453 proposes a countermeasure against failure in tracking caused by a tracking error that can occur during object tracking due to an image noise or a change in shape of a tracking-target object. More specifically, a method of continuing tracking without interruption by receiving an input, which is input by a user, of a tracking point for correcting a tracking result has been proposed.

In a general tracking method, object tracking of an object captured in consecutive image frames is performed by determining, in an image frame F0, an initial tracking-target region ABCD as illustrated in FIG. 9 and thereafter performing a tracking process on the object in a subsequent image frame. More specifically, when a tracking-result region A'B'C'D' in an FM frame (which is the Mth image frame) illustrated in FIG. 10B is obtained in relation to the initial tracking-target region ABCD in the F0 frame (initial image frame) illustrated in FIG. 10A, the tracking process is performed on a subsequent image frame by using the tracking-result region in the FM frame as a new tracking-target region.

However, in a situation where an initial tracking-target region is restricted or the like, when the initial tracking-target region ABCD is selected as illustrated in FIG. 11A, the region A'B'C'D', which is a region other than an intended tracking-target region, can be undesirably obtained as a result of tracking in the FM frame. In the example illustrated in FIGS. 11A and 11B, only a portion of an object is included in the initial tracking-target region; hence, the initial tracking-target region is inappropriately selected. Accordingly, the tracking-result region undesirably tracks a different portion of the target object, making a tracking result unstable.

A conventional technique, such as that disclosed in Japanese Patent Application Laid-open No. 2008-153879, is disadvantageous in that a probability to fail in the object tracking becomes high if an initial tracking-target region such as that illustrated in FIGS. 11A and 11B is selected.

With the technique of Japanese Patent Application Laid-open No. 2009-10453, in a case where a failure of tracking should occur, correction therefor can be performed; however, if an initial tracking-target region is not selected appropriately, a result of the tracking becomes unstable as well to require frequent manual interventions. This places a large burden on a user.

Due to the above circumstances, an object tracking method of automatically selecting an appropriate initial tracking-target region to reduce a chance of failure in tracking has been desired.

The present invention has been conceived in view of the above circumstances and provides an image capturing apparatus having an object tracking function that yields a stable tracking result from tracking of an object in time-series image frames and achieves an increased tracking success rate, and an image capturing method.

DISCLOSURE OF INVENTION

It is an object of the present invention to at least partially solve the problems in the conventional technology.

An image capturing apparatus includes: an image input unit that inputs an image; a designating unit that receives designation of an initial tracking-target region that is a first region in a first image frame of time-series image frames that have been input from the image input unit; a feature value extracting unit that extracts a predetermined feature value from a target region in the first image frame; a first search unit that searches for a second region obtained by changing a size of the first region and by determining whether the feature value extracted from the second region satisfies a predetermined condition for enabling successful tracking and sets the second region as a new initial tracking-target region; and a second search unit that searches for a region similar to the newly set initial tracking-target region as a tracking-result region in a second image frame subsequent to the first image frame of the time-series image frames.

An image capturing method performed by an image capturing apparatus includes: inputting an image; receiving designation of an initial tracking-target region that is a first region in a first image frame of time-series image frames with the receiving performed by a designating unit; extracting a predetermined feature value from a target region in the first image frame; first searching for a second region obtained by changing a size of the first region and by determining whether the feature value extracted from the second region satisfies a predetermined condition for enabling successful tracking and setting the second region as a new initial tracking-target region; and second searching for a region similar to the newly set initial tracking-target region as a tracking-result region in a second image frame subsequent to the first image frame of the time-series image frames.

A computer program product includes a non-transitory computer-usable medium having a computer-readable program code embodied in the medium causing a computer to execute: inputting an image; receiving designation of an initial tracking-target region that is a first region in a first image frame of time-series image frames with the receiving performed by a designating unit; extracting a predetermined feature value from a target region in the first image frame; first searching for a second region obtained by changing a size of the first region and by determining whether the feature value extracted from the second region satisfies a predetermined condition for enabling successful tracking and setting the second region as a new initial tracking-target region; and second searching for a region similar to the newly set initial tracking-target region as a tracking-result region in a second image frame subsequent to the first image frame of the time-series image frames.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWINGS

FIG. 1 is a block diagram illustrating the configuration of an object tracking apparatus according to an embodiment.

BEST MODE(S) FOR CARRYING OUT THE INVENTION

Figure 2A:
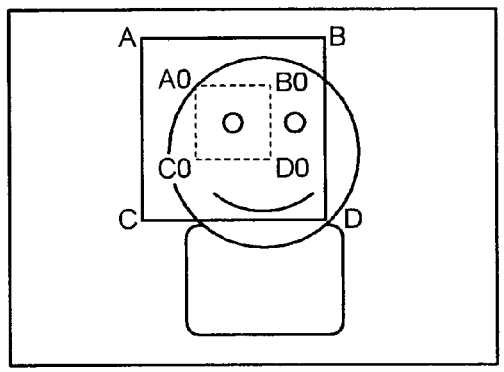
FIGS. 2A and 2B are explanatory diagrams of an initial-tracking-target-region calculating process and a tracking process according to the embodiment.

An object tracking apparatus for embodying an object tracking function of an image capturing apparatus according to embodiments will be described in detail below with reference to the accompanying drawings.

First, the configuration of the object tracking apparatus according to an embodiment is described below with reference to FIG. 1. FIG. 1 is a block diagram illustrating the configuration of the object tracking apparatus according to the embodiment. The configuration of the object tracking apparatus described below is applicable to a control unit, an image processing unit, and the like of the image capturing apparatus, such as a digital still camera.

The object tracking apparatus illustrated in FIG. 1 includes an image input unit 101, an initial-region designating unit 102 for designating an initial-tracking-target region, an initial-region calculating unit 103 for calculating an initial-tracking-target region, a tracking processing unit 104, a tracking-result output unit 105, and a control processing unit 106.

Figure 9:
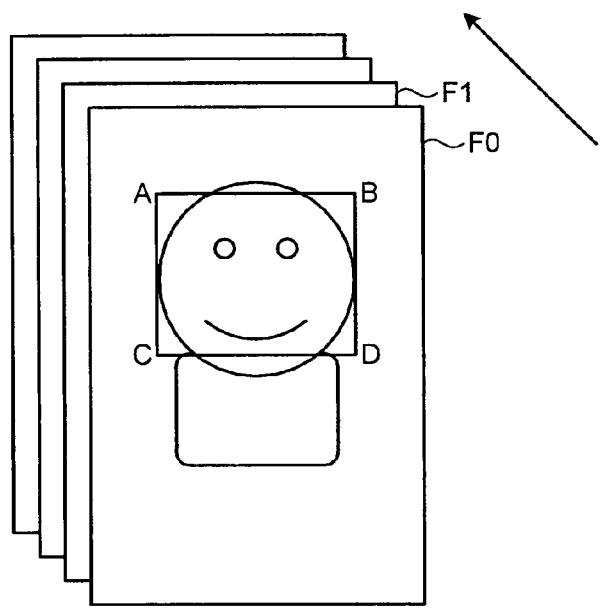
FIG. 9 is a diagram for explaining a general tracking method.
Figure 10A:
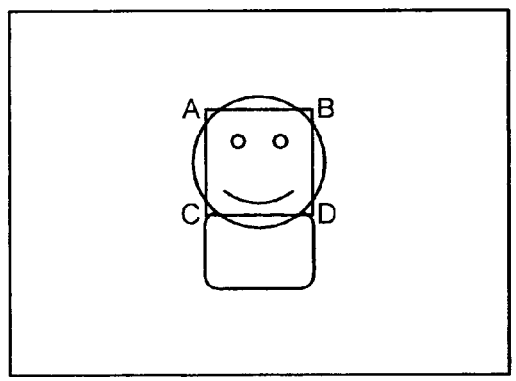
FIGS. 10A and 10B are other diagrams for explaining the general tracking method.
Figure 10B:
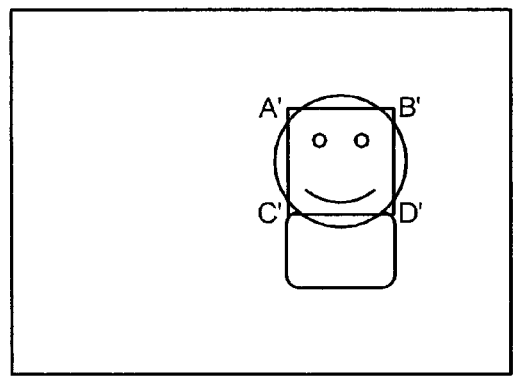

The image input unit 101 sequentially inputs data of consecutive, time-series image frames obtained from moving images or a plurality of still images captured by the image capturing apparatus or an image processing apparatus. As illustrated in FIG. 9, F0 represents an initial image frame. After a lapse of time interval Δt from input of the image frame F0, a subsequent image frame F1 is to be input. N pieces of time-series image frames are sequentially input one in this manner. This image frame set including these image frames serves as tracking-target image data.

The initial-region designating unit 102 receives designation of an initial tracking-target region A0B0C0D0 in the initial image frame F0. In the example illustrated in FIG. 2A, the region A0B0C0D0 is designated as the initial tracking-target region. The designation of the initial tracking-target region A0B0C0D0 can be made by using, for instance, a liquid crystal display integrally formed with a touch panel of the digital still camera or the like. A user can directly input, by tapping, coordinates of the four corners A0, B0, C0, and D0 of the initial tracking-target region A0B0C0D0. Alternatively, the designation can be made by receiving an input of coordinates of one point, e.g., a point near the region A0B0C0D0, designated by a user and automatically calculating the initial tracking-target region A0B0C0D0 having a predetermined size with a center located at the input coordinates. Note that the initial tracking-target region A0B0C0D0 or a tracking-target region ABCD to be described below, does not necessarily take a rectangular shape illustrated in FIG. 2A or 2B, and can have another shape such as an ellipse, a circle, a polygon, or a combination of a plurality of rectangles.

The initial-region calculating unit 103 performs calculation to determine, as a new initial tracking-target region ABCD, a region that satisfies a condition described below based on the initial tracking-target region A0B0C0D0 designated by using the initial-region designating unit 102. More specifically, a feature extracting unit 103a calculates a color histogram of N bins of a color image in the designated initial tracking-target region A0B0C0D0 illustrated in FIG. 2A. Subsequently, the feature extracting unit 103a calculates an entropy E from the calculated color histogram by using Equation (1). In Equation (1), $h_i$ is a value of the ith bin in the color histogram.

$$E = \sum_{i=1}^{N} -h_i \log h_i \qquad (1)$$

Figure 11A:
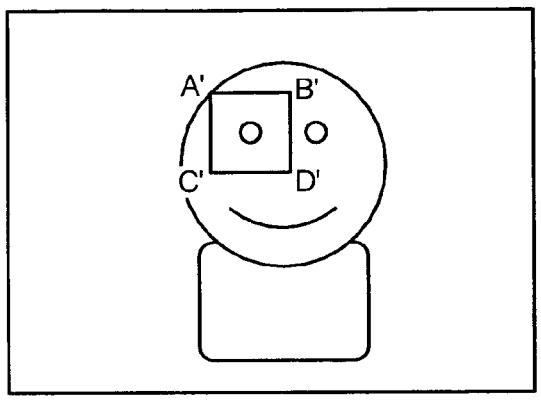
FIGS. 11A and 11B are diagrams illustrating a failure in tracking that can occur when the general tracking method is performed.
Figure 11B:
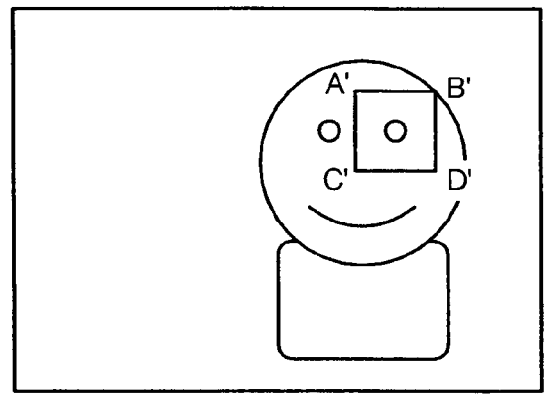

A first search unit 103b causes the size of the initial tracking-target region A0B0C0D0 to change (in this example, the size is increased) and recalculates the entropy E of the color histogram. A region ABCD that maximizes the entropy E is selected as a new initial tracking-target region. Determining the initial tracking-target region ABCD in this manner prevents the occurrence of a failure in tracking such as that illustrated in FIGS. 11A and 11B, thereby achieving correct and stable tracking. Meanwhile, when the entropy E calculated from regions obtained by changing the size of the initial tracking-target region A0B0C0D0 does not exceed a threshold value Eth, or, put another way, when a maximum value of the entropy E does not exceed the threshold value Eth, an alarm (for example, an alarm display on a display device, such as a liquid crystal display, that is not illustrated in FIG. 1 or an alarm sound by using a sound output device, such as a speaker) indicating that the calculation of the initial tracking-target region cannot be executed is issued, and the tracking process, which is to be described below, performed by the tracking processing unit 104 is terminated.

Figure 2B:
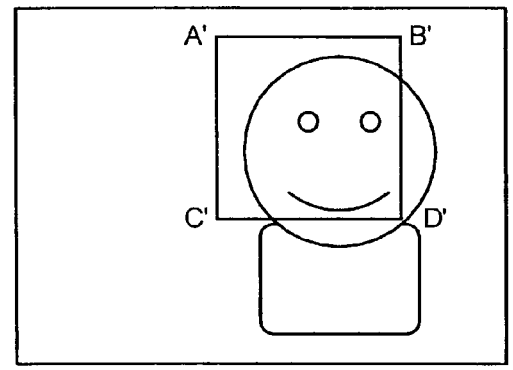

The tracking processing unit 104 performs a search in the subsequent image frame FM for a region A'B'C'D' having greatest similarity with the initial tracking-target region ABCD calculated by the initial-region calculating unit 103 by using the initial tracking-target region ABCD as a template and extracts the region A'B'C'D' as illustrated in FIG. 2B. More specifically, a similarity calculating unit 104a calculates similarities as described below; a second search unit 104b searches for the region A'B'C'D' that has the greatest similarity with the initial tracking-target region ABCD (details will be described later). A tracking-result region is obtained as a region surrounded by coordinates of the vertices A', B', C', and D'.

The tracking-result output unit 105 outputs information about the tracking-result region as a result of the tracking performed by the tracking processing unit 104.

Upon receiving the tracking result (the information about the tracking-result region) output from the tracking-result output unit 105, the control processing unit 106 performs control operations according to the tracking result. For example, when a focal point is to be placed on the tracking-target region ABCD, the control processing unit 106 performs control operations for causing the focal point to remain on the tracking-result region A'B'C'D' in each of succeeding image frames.

As described above, the object tracking apparatus of the present embodiment includes the initial-region calculating unit 103 that evaluates the entropy E of the color histogram, which is a feature value of the designated initial tracking-target region, and changes the size of the initial tracking-target region so as to make the entropy E of the initial tracking-target region greater than the predetermined threshold value for successful tracking, thereby stabilizing the object tracking.

Figure 3:
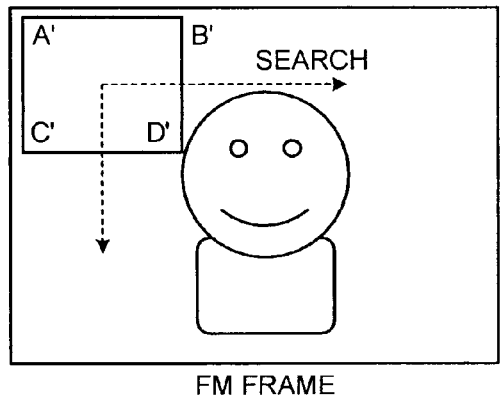
FIG. 3 is an explanatory diagram of the tracking process according to the embodiment.

The tracking process to be performed by the object tracking apparatus according to the present embodiment is described in detail below. FIG. 3 is an explanatory diagram of the tracking process.

As illustrated in FIG. 3, a search for the region A'B'C'D' (which is to be the tracking-result region) that is most similar to the initial tracking-target region ABCD is performed by shifting a position of a window A'B'C'D', or a search region, over the image frame FM that is a tracking target. More specifically, the search is performed by shifting the position of the search region A'B'C'D' (this region is identical with the initial tracking-target region ABCD calculated by the initial-region calculating unit 103 in shape and size at an initial search stage), which is a candidate of the tracking-result region, pixel by pixel from an upper-left corner, thereby finding a region having the greatest similarity with the initial tracking-target region ABCD in the image frame F0.

The similarity between the initial tracking-target region ABCD in the image frame F0 and the search region A'B'C'D' in the image frame FM is calculated by using feature values of the corresponding images. In the calculation, a color histogram of the initial tracking-target region ABCD and that of the search region A'B'C'D' are used. The color histogram of the region ABCD is represented by q=[q1, q2, ..., qn]. Here, q1, q2, ..., qn are pixel numbers, in each color component, from brightness level 1 to brightness level n. The color histogram of the search region A'B'C'D' is represented by p =[p1, p2, ..., pn]. All pixels in a target region are normalized in the calculation of the color histogram so as to minimize the influence of a change in the area.

A similarity Sim between the initial tracking-target region ABCD and the search region A'B'C'D' is calculated from Equation (2) below.

$$Sim = \sum_{u=1}^{n} \sqrt{p_u * q_u} \quad (2)$$

The search region A'B'C'D' that maximizes the similarity Sim is to be selected as the tracking-result region.

Meanwhile, the size of a subject can vary between different frames. Accordingly, an actual search is performed such that an entire-screen search is performed by using a window of an initial size (the size of the search region A'B'C'D' at the initial search), and thereafter further searches are performed by changing the window size with a magnification coefficient M. The searches are performed for all the positions by using the windows of all the sizes in this way, and the search region A'B'C'D' that maximizes the similarity Sim obtained by Equation (2) is determined as the tracking-result region.

Figure 4:
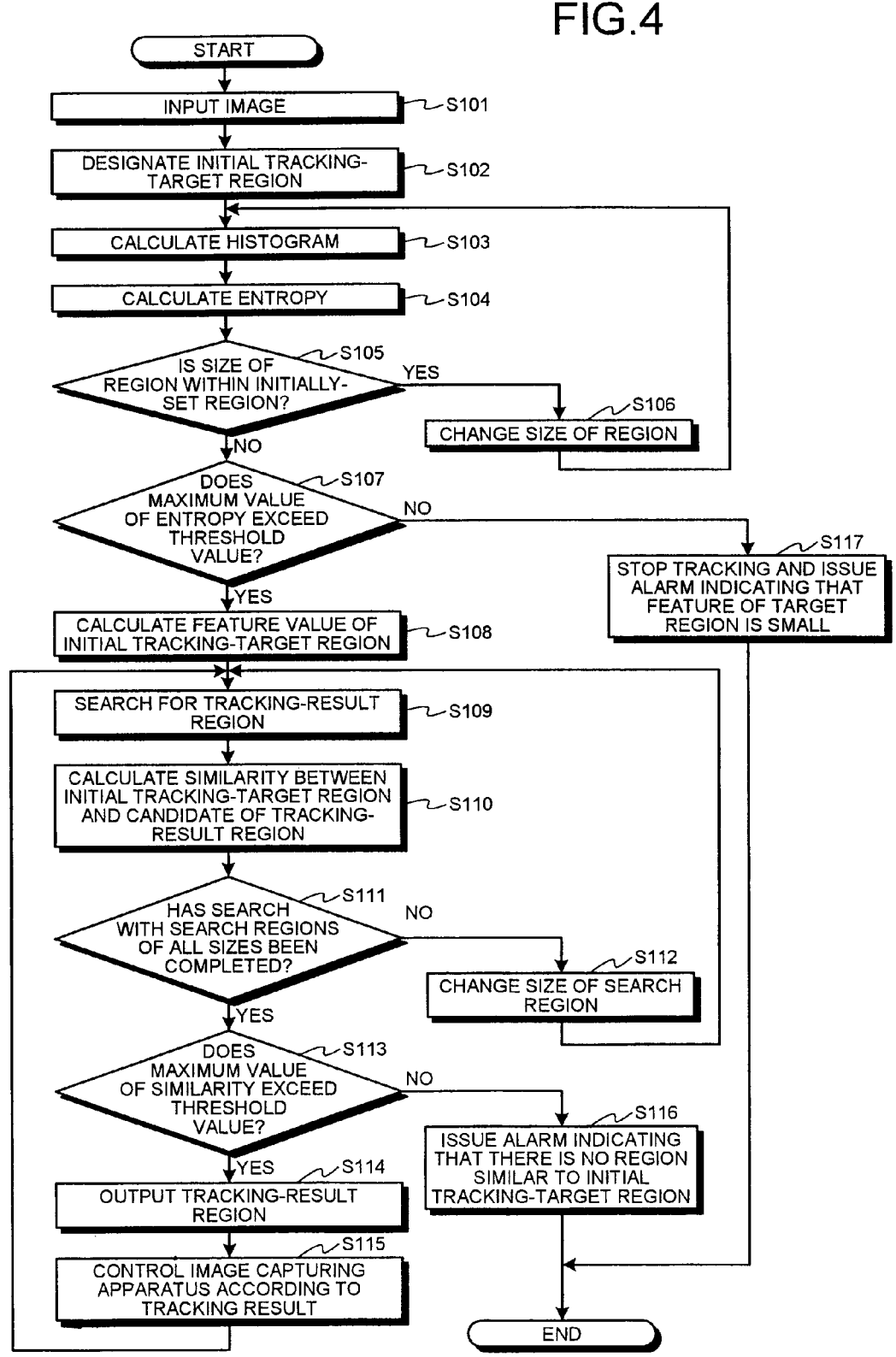
FIG. 4 is a flowchart for explaining a series of processes involved in object tracking to be performed by the object tracking apparatus according to the embodiment.

A series of processes involved in the object tracking to be performed by the object tracking apparatus is described below with reference to the flowchart illustrated in FIG. 4.

First, an image is input from an image capturing apparatus or an image processing apparatus (Step S101). At this step, data of time-series image frames obtained from moving images or a plurality of still images captured by an image capturing apparatus or an image processing apparatus is input.

Subsequently, designation of an initial tracking-target region in the first image frame of the input time-series image frames is received (Step S102). For example, the region A0B0C0D0 illustrated in FIG. 2A is designated.

Subsequently, a feature value of the initial tracking-target region A0B0C0D0 is calculated. At this step, first, a color histogram of pixels in the initial tracking-target region A0B0C0D0 is generated (Step S103). If a tracking-target image is a color image, a histogram is generated for each of color components, R, G, and B. By combining the histograms of the RGB components together, a color histogram of N bins can be obtained. Meanwhile, the color histogram can be obtained by generating a histogram for each of color components other than RGB; examples of the other color components include YCrCb and Lab. In a case where the input image is only a brightness image, a histogram of brightness is to be generated as the feature.

The entropy E of the color histogram is calculated from Equation (1) described above (Step S104). The greater the value of the entropy E, the greater the feature value of the tracking-target region.

As presented in Step S103 through Step S106, the calculation of the color histogram and the calculation of the entropy E described above are to be repeatedly performed for regions obtained by changing the size of the initial tracking-target region A0B0C0D0 from the initial size within an initially-set size range (width_min, width_max) of the region as illustrated in FIG. 2A (if the size is within the size range, determination is made at Step S105 as YES) (Step S106).

When the calculation of the color histogram and the calculation of the entropy E throughout the initially-set size range (width_min, width_max) of the region are completed (in this case, the determination is made at Step S105 as NO), and if a maximum value of the entropy E is greater than the threshold value Eth (a first threshold value), the region that maximizes the entropy E is determined as the initial tracking-target region ABCD. That is, the entropy E is calculated for each of regions obtained by changing the size of the initial tracking-target region A0B0C0D0. The region ABCD, an example of which is illustrated in FIG. 2A, at which the entropy E is maximized and equal to or greater than the threshold value Eth, is finally selected as the initial tracking-target region. The tracking process is to be performed by using the initial tracking-target region ABCD.

Changing the region size to be performed at Step S106 is described in detail below. To find the maximum value of the entropy E, first, search is performed from an initially-set region size in a direction to reduce the size until the size reaches the initially-set minimum size width_min to find a maximum value E1 of the entropy E. Search is then performed in a direction to increase the size from the initially-set size until the size reaches the initially-set maximum size width_max to find a maximum value E2 of the entropy E. A greater one of the entropy E1 and the entropy E2 is selected as an overall maximum value. If the overall maximum value is greater than the threshold value Eth, the region of the size where the overall maximum value is obtained is finally selected as the initial tracking-target region. Note that the search for the maximum value of the entropy E may be performed in reverse, with respect to the search described above, such that the search is performed from the initially-set size in the direction to increase the size, and then, returning to the initially-set size, from which the search is performed in the direction to reduce the size.

Referring back to FIG. 4, if the maximum value of the entropy E of the color histogram obtained by changing the size of the initial tracking-target region A0B0C0D0 does not exceed the threshold value Eth (NO at Step S107), process control skips the tracking process to be performed in Step S108 and subsequent steps and proceeds to Step S117. If the maximum value of the entropy E is smaller than the threshold value Eth, feature values of regions in the search range are small and the tracking may possibly fail, so that the alarm is to be issued (Step S117). This treatment allows a tracking process that may fail with high possibility to be omitted and a user is informed that the tracking of the initially-designated object (subject) cannot be performed.

In contrast, if the initial tracking-target region ABCD has successfully been determined as described above, that is, if the result of the determination process at Step S107 is YES, the tracking process is performed by using the thus-determined initial tracking-target region ABCD. The tracking process, which has already been described above, is described below along the flowchart illustrated in FIG. 4.

As illustrated in FIG. 3, by moving the window A'B'C'D' that is the search region within the image frame FM being the tracking target, a search of the tracking-result region that is the most similar to the initial tracking-target region ABCD is performed. More specifically, the feature value (in this example, the color histogram) of the initial tracking-target region ABCD is calculated first (Step S108). Meanwhile, the feature value of the initial tracking-target region ABCD calculated at preceding steps from Step S103 to Step S106 may be stored to be used as the feature value of the initial tracking-target region ABCD that is to be obtained at Step S108.

Subsequently, in the search for the tracking-result region to be performed at Step S109, a color histogram of the search region A'B'C'D' at every position of the search target in the image frame FM, is generated by moving the position of the search region A'B'C'D' (this region has the same shape and the same size as the initial tracking-target region ABCD calculated at the initial search stage by the initial-region calculating unit 103), which is a candidate of the tracking-result region, pixel by pixel from the upper-left corner and then further shifting the position pixel by pixel from a left end of a next line (row).

Subsequently, the similarity between the initial tracking-target region ABCD and each search region A'B'C'D' that is the candidate of the tracking-result region is calculated by using the color histogram of the initial tracking-target region ABCD and the color histogram of the search region A'B'C'D' that is the candidate of the tracking-result region (Step S110). The similarity Sim between the initial tracking-target region ABCD and the search region A'B'C'D' is calculated from Equation (2) described above.

Subsequently, it is determined whether the search with search regions of all sizes has been completed (Step S111). The determination process is performed in the actual search process, as described above, as the entire-screen search by using the window (the search region A'B'C'D') of the initial size, and thereafter the search process at Step S109 and subsequent steps is performed by changing the window size with the magnification coefficient M because the size of the subject can vary between different frames. If the search with the search regions of all the sizes has not been completed yet (NO at Step S111), process control proceeds to Step S112, where the size of the search region A'B'C'D' is changed.

In contrast, if the search with the search regions of all the sizes has been completed (YES at Step S111), process control proceeds to Step S113, where it is determined whether the maximum value of the similarity between the initial tracking-target region ABCD and each search regions A'B'C'D' that is the candidate of the tracking-result region exceeds a predetermined threshold value (second threshold value) (Step S113).

If the maximum value of the similarity does not exceed the predetermined threshold value (NO at Step S113), there is no region that is similar to the initial tracking-target region ABCD in the image frame FM. In this case, process control proceeds to Step S116, where an alarm indicating that there is no region similar to the initial tracking-target region ABCD is issued.

On the contrary, if the maximum value of the similarity exceeds the predetermined threshold value (YES at Step S113), the search region A'B'C'D' that maximizes the similarity Sim is output as the tracking-result region (Step S114).

The control processing unit 106 performs control operations on the image capturing apparatus according to the tracking result (Step S115) such as auto-focusing control on the tracking-target object. Thereafter, the tracking process at Step S109 and subsequent steps is repeatedly performed on subsequent image frames. Meanwhile, when a search in a subsequent image frame is to be performed by using the tracking-result region in the image frame FM as the new initial tracking-target region ABCD, the color histogram of the tracking-result region obtained at Step S114 is stored for use in the similarity calculation at Step S110.

The series of operations involved in the object tracking to be performed by the object tracking apparatus has been described above.

The hardware configuration of a digital still camera, that is an embodiment of the image capturing apparatus for performing image processing including the object tracking process described above, will be described below.

Figure 5:
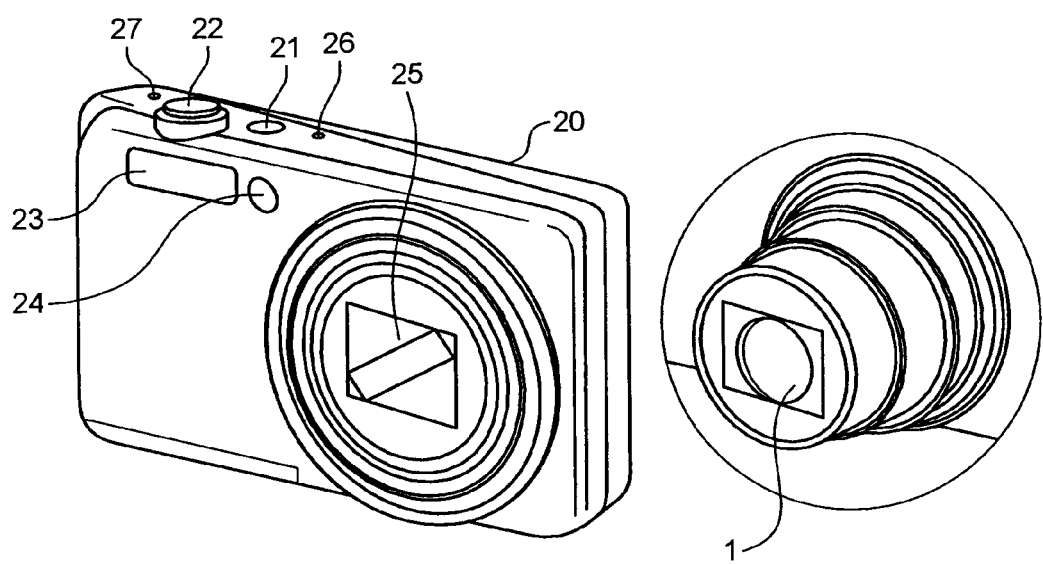
FIG. 5 is a diagram illustrating an external appearance of a digital still camera as an example of an image capturing apparatus that has an object tracking function.
Figure 6:
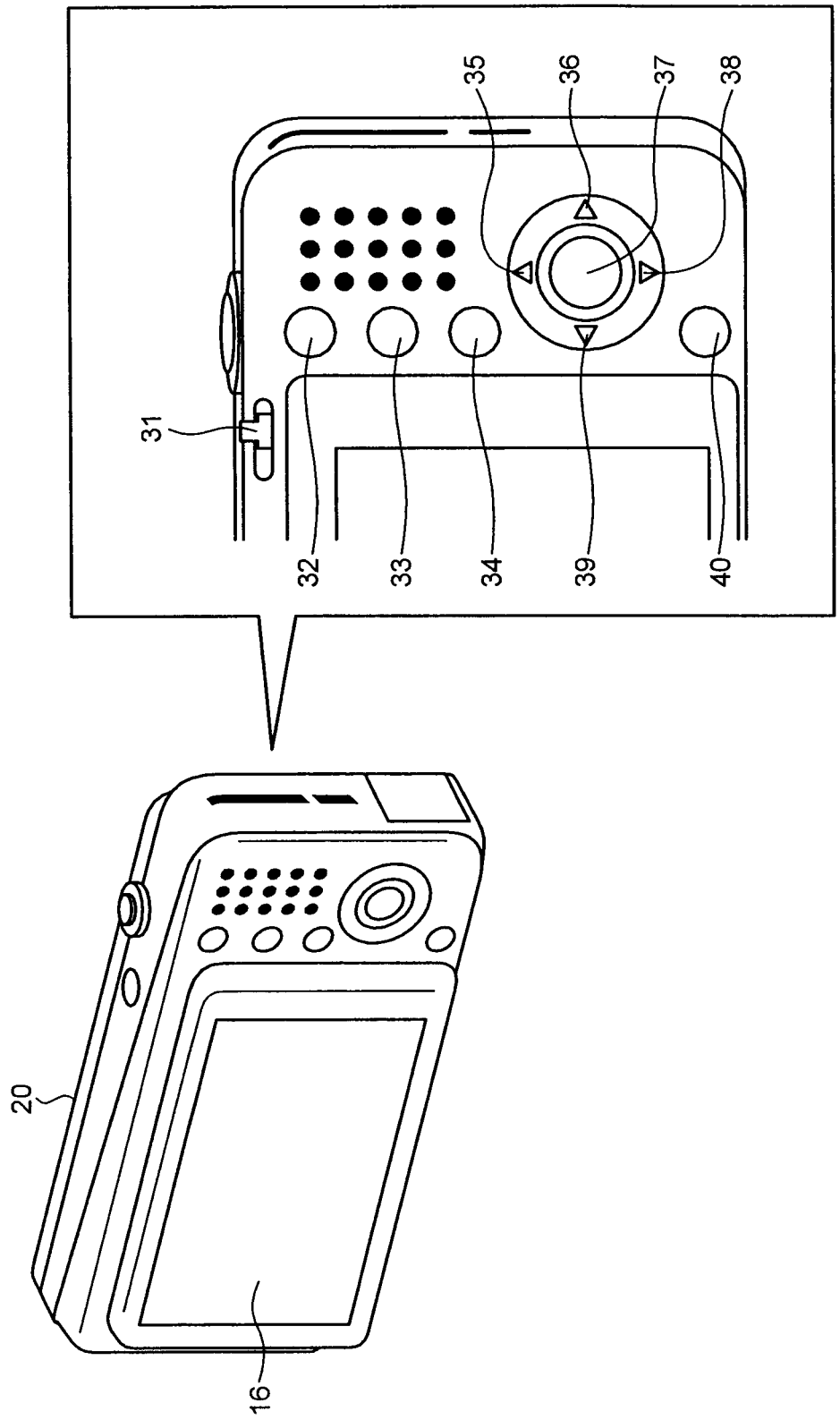
FIG. 6 is another diagram illustrating the external appearance of the digital still camera as an example of the image capturing apparatus that has the object tracking function.

FIGS. 5 and 6 are views illustrating an external appearance of the digital still camera according to the embodiment. Similarly to an ordinary digital camera, a digital still camera 20 includes, on a front surface or a top surface of a body, a power (power supply) button 21, a shutter release button 22, a flashlight emitting unit 23, an autofocus assist light/self-timer lamp 24, a lens cover 25, a microphone 26, a speaker 27, and an image-capturing optical system 1 that includes an image-capturing lens.

As illustrated in FIG. 6, the digital camera 20 includes, on a back surface, various buttons and switches including a liquid crystal display 16 (hereinafter, abbreviated as "LCD 16"), a mode-switching switch 31, a playback button 32, an adjustment(ADJ.) button 33, a delete/self-timer button 34, an up-arrow/mode button 35, a right-arrow/quick-review button 36, a menu/OK button 37, a down-arrow/macro button 38, a left-arrow/flashlight button 39, and a display (DISP.) button 40. The buttons and the switches arranged on the top surface and the back surface of the digital still camera 20 form an operating unit (an operating unit 15, which will be described later) of the digital still camera 20.

The image-capturing optical system 1 includes a retractable zoom lens. When the camera is turned on by pressing the power (power supply) button 21 and mode of the camera is set in a photographing mode by using the mode-switching switch 31, the retractable zoom lens is caused to project out from the body of the digital camera 20.

The LCD 16 includes an LCD panel capable of displaying a color image and a touch panel. In a playback mode, the LCD 16 is used as an image display panel for displaying a captured image and also used as a user-interface display panel for receiving inputs related to various setting operations entered by various operations, such as tapping and dragging, on the touch panel by a user. In the photographing mode, the LCD 16 displays a live view as required to be used as a monitor display for checking an angle of view.

Figure 7:
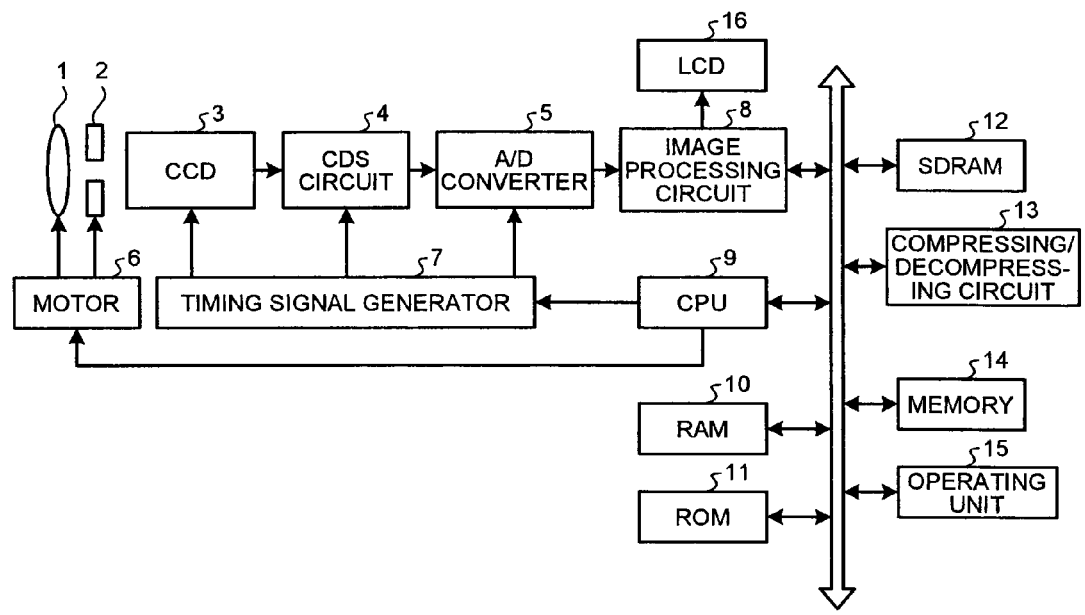
FIG. 7 is a block diagram illustrating an internal configuration of the digital still camera.

An internal configuration of the digital still camera 20 of the embodiment is described below with reference to FIG. 7. FIG. 7 is a block diagram illustrating the internal configuration of the digital still camera 20.

As illustrated in FIG. 7, an object light that passes through the image-capturing optical system 1 is incident on a charge coupled device (CCD) 3. A mechanical shutter 2 is arranged between the image-capturing optical system 1 and the CCD 3. The mechanical shutter 2 is capable of shielding a light incident on the CCD 3. The image-capturing optical system 1 and the mechanical shutter 2 are driven by a motor 6.

The CCD 3 converts an optical image formed on an imaging surface thereof into an electric signal and outputs the electric signal as an analog image signal. The image signal output from the CCD 3 is subjected to noise-component reduction performed by a correlated double sampling (CDS) circuit 4, converted into a digital signal having digital values (RGB) by an analog-to-digital (A/D) converter 5, and thereafter output to an image processing circuit 8.

The image processing circuit 8 performs, by using synchronous DRAM (SDRAM) 12 that temporarily stores image data, various image processing, such as YCrCb conversion processing, white balance control processing, contrast correction processing, edge enhancement processing, and color conversion processing. Meanwhile, the white balance processing is image processing for adjusting color intensities of the image data; the contrast correction processing is image processing for adjusting contrast of the image data. The edge enhancement processing is image processing for adjusting sharpness of the image data; the color conversion processing is image processing for adjusting hue of the image data. The image processing circuit 8 displays image data, on which various signal processing and image processing have been performed, on the LCD 16.

The image data, on which the various signal processing and the image processing have been performed, is stored in a memory card 14 (denoted as "MEMORY" in FIG. 7) via a compressing/decompressing circuit 13. The compressing/decompressing circuit 13 is a circuit that compresses image data output from the image processing circuit 8 and outputs the compressed image data to the memory card 14, and decompresses image data read out from the memory card 14 and outputs the decompressed image data to the image processing circuit 8 according to designation fed from the operating unit 15.

Operation timing of the CCD 3, the CDS circuit 4, and the A/D converter 5 is controlled by a central processing unit (CPU) 9 via a timing signal generator 7 that generates a timing signal. Furthermore, the image processing circuit 8, the compressing/decompressing circuit 13, and the memory card 14 are also controlled by the CPU 9.

The digital still camera 20 internally includes a read only memory (ROM) 11, that is a read only memory for storing a control program and the like, and a random access memory (RAM) 10, that is a readable/writable memory having a work area for use in various processes and a storage area for storing various data. The ROM 11 and the RAM 10 are connected to each other over a bus line. The CPU 9 performs various computations according to the control program including an image processing program and controls each unit of the digital still camera 20.

The image processing program to be executed in the digital still camera 20 of the embodiment has a module configuration including the tracking function described above. On real hardware, the CPU (processor) 9 reads out the image processing program from the ROM 11 that is a storage medium, and executes the program to load each of the units illustrated in FIG. 1 on the RAM 10 serving as a main memory, thereby performing the object tracking. The image processing program is configured to optimally control the digital still camera 20 by using a result of the object tracking and to perform image capturing and image processing on an image, and to store the image, after compressing, in the memory card 14.

An overview of processes involved in the object tracking to be performed by the digital still camera 20 of the embodiment is described below.

First, from image data of moving images, having been input to the image processing circuit 8 via the image-capturing optical system 1, the CCD 3, the CDS circuit 4, and the A/D converter 5, and to be displayed for monitoring, image data of latest two frames are obtained at a time interval of $\Delta t$ and stored in the SDRAM 12. The object tracking is performed by using the image frames obtained from the moving images.

Figure 8:
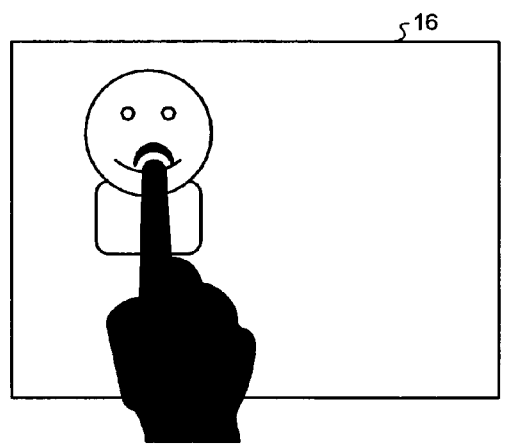
FIG. 8 is a diagram illustrating a situation where an initial tracking-target region is designated by a tapping operation.

Here, designation of an initial tracking-target region is performed by receiving coordinates of a point designated and input by a user on the digital still camera 20. The rectangular region A0B0C0D0 illustrated in FIG. 2A, or a region of another shape, such as an oval, circular, or polygonal shape, that includes the point is set as the initial tracking-target region. In the digital still camera 20 of the embodiment, for instance, the coordinates can be designated by the user by tapping, similarly to a click operation on a mouse, a certain point on an image displayed on the LCD 16 via the touch panel of the LCD 16 as illustrated in FIG. 8.

When the initial tracking-target region A0B0C0D0 illustrated in FIG. 2A is input, the CPU 9 calculates a color histogram of this region as described above according to the image processing program. The CPU 9 then calculates the entropy E of the color histogram from Equation (1), searches for a region that maximizes the entropy E, and determines the region as the initial tracking-target region ABCD.

Subsequently, as illustrated in FIG. 6, by changing the size and the position of the search region A'B'C'D' that is a candidate of the tracking-result region, the CPU 9 determines similarity in color histograms between the initial tracking-target region ABCD and each of the search region A'B'C'D'. The CPU 9 selects the search region A'B'C'D' that maximizes the similarity Sim as the tracking-result region.

When the tracking-result region A'B'C'D' has been obtained, the CPU 9 controls the digital still camera 20 of the embodiment using information on the tracking-result region A'B'C'D'. For example, when a focal point is to be placed on the tracking-target region ABCD, the CPU 9 performs control operations for causing the focal point to remain on the tracking-result region A'B'C'D' in each of subsequent image frames.

Image data input after the shutter release button 22 has been pressed by the user is subjected to predetermined signal processing and image processing performed by the image processing circuit 8, and is thereafter stored in the memory card 14 via the compressing/decompressing circuit 13.

The digital still camera has been described above as the embodiment of the image capturing apparatus that performs image processing including the object tracking process. Thus, the object tracking function of the object tracking apparatus described above can be applied to and implemented in an image capturing apparatus, such as a digital still camera. The image capturing apparatus, such as a digital still camera, provided with the object tracking function can yield a stable tracking result from tracking of an object (subject) in time-series image frames and achieve an increased tracking success rate.

Although the embodiment has been described in referring to the digital still camera, the present embodiment may be applied to an object-tracking system including, for example, a video camera.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An image capturing apparatus, comprising:
   an image input unit that inputs a time-series of image frames;
   a designating unit that receives designation of an initial tracking-target region that is a first region in a first image frame of the input time-series of image frames;
   a feature value extracting unit that extracts a feature value from a target region in the first image frame, wherein the feature value is an entropy of a color histogram of the target region in the first image frame;
   a first search unit that searches for a second region obtained by changing a size of the first region and by determining whether a feature value extracted from the second region satisfies a predetermined condition for enabling successful tracking, and sets the second region as a new initial tracking-target region; and
   a second search unit that searches for a region similar to the new initial tracking-target region as a tracking-result region in a second image frame subsequent to the first image frame of the time-series of image frames.

2. The image capturing apparatus according to claim 1, further comprising a control unit that controls the image capturing apparatus based on information on the tracking-result region that is a result of the search performed by the second search unit.

3. The image capturing apparatus according to claim 1, wherein
   the first search unit searches for a region that maximizes the entropy as the new initial tracking-target region.

4. The image capturing apparatus according to claim 3, further comprising a similarity calculating unit that calculates similarity between a color histogram of the new initial tracking-target region and a color histogram of a region to be searched, wherein
   the second search unit performs the search for the tracking-result region based on the similarity calculated by the similarity calculating unit.

5. The image capturing apparatus according to claim 3, wherein
   when a maximum value of the entropy is equal to or less than an initially-set threshold value, the first search unit causes the second search unit to stop performing the search.

6. An image capturing method performed by an image capturing apparatus, the image capturing method comprising:
   inputting a time-series of image frames;
   receiving designation of an initial tracking-target region that is a first region in a first image frame of the input time-series of image frames;
   extracting a feature value from a target region in the first image frame, wherein the feature value is an entropy of a color histogram of the target region in the first image frame;
   first searching for a second region obtained by changing a size of the first region and by determining whether a feature value extracted from the second region satisfies a predetermined condition for enabling successful tracking, and setting the second region as a new initial tracking-target region; and
   second searching for a region similar to the new initial tracking-target region as a tracking-result region in a second image frame subsequent to the first image frame of the time-series of image frames.

7. The image capturing method according to claim 6, further comprising controlling of the image capturing apparatus based on information on the tracking-result region that is a result of a search performed at the second searching.

8. The image capturing method according to claim 6, wherein
   the first searching includes searching for a region that maximizes the entropy as the new initial tracking-target region.

9. The image capturing method according to claim 8, further comprising:
   calculating similarity between a color histogram of the new initial tracking-target region and a color histogram of a region to be searched; and
   searching for the tracking-result region based on the similarity calculated at the second searching and the similarity calculating.

10. The image capturing method according to claim 8, wherein
    when a maximum value of the entropy does not exceed an initially-set first threshold value, the first searching causes to stop performing a search at the second searching.

11. A computer program product comprising a non-transitory computer-usable medium having a computer-readable program code embodied in the medium causing a computer to execute:
    inputting a time-series of image frames;
    receiving designation of an initial tracking-target region that is a first region in a first image frame of the input time-series of image frames;
    extracting a feature value from a target region in the first image frame, wherein the feature value is an entropy of a color histogram of the target region in the first image frame;
    first searching for a second region obtained by changing a size of the first region and by determining whether a feature value extracted from the second region satisfies a predetermined condition for enabling successful tracking, and setting the second region as a new initial tracking-target region; and
    second searching for a region similar to the new initial tracking-target region as a tracking-result region in a second image frame subsequent to the first image frame of the time-series of image frames.

* * * * *